(12) United States Patent
Yoon et al.

(10) Patent No.: US 10,002,429 B2
(45) Date of Patent: Jun. 19, 2018

(54) APPARATUS AND METHOD FOR NOTIFYING A VIRTUAL REALITY USER OF REAL WORLD OBJECTS

(71) Applicant: Samsung Electronics Co., Ltd., Gyeonggi-do (KR)

(72) Inventors: Suk Hwan Yoon, Sunnyvale, CA (US); Waddah Kudaimi, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 14/828,107

(22) Filed: Aug. 17, 2015

(65) Prior Publication Data

US 2017/0053440 A1 Feb. 23, 2017

(51) Int. Cl.
G06T 19/00 (2011.01)
G06T 7/00 (2017.01)
G06F 3/16 (2006.01)
G06F 3/01 (2006.01)

(52) U.S. Cl.
CPC .............. *G06T 7/004* (2013.01); *G06F 3/011* (2013.01); *G06F 3/167* (2013.01); *G06T 19/006* (2013.01)

(58) Field of Classification Search
None
See application file for complete search history.

(56) References Cited

U.S. PATENT DOCUMENTS

| 5,900,849 | A | * | 5/1999 | Gallery | G06F 3/011 |
| | | | | | 273/148 B |
| 8,881,056 | B2 | | 11/2014 | Adachi | |
| 2003/0210228 | A1 | * | 11/2003 | Ebersole | G02B 27/017 |
| | | | | | 345/157 |
| 2013/0328928 | A1 | | 12/2013 | Yamagishi et al. | |
| 2013/0335301 | A1 | * | 12/2013 | Wong | G02B 27/0093 |
| | | | | | 345/8 |
| 2014/0063055 | A1 | * | 3/2014 | Osterhout | G06F 3/005 |
| | | | | | 345/633 |
| 2014/0364212 | A1 | | 12/2014 | Osman et al. | |
| 2015/0094142 | A1 | | 4/2015 | Stafford | |
| 2016/0042567 | A1 | * | 2/2016 | Shuster | H04N 13/00 |
| | | | | | 345/633 |

(Continued)

OTHER PUBLICATIONS

Cirio, G., et al., "The Magic Barrier Tape: A Novel Metaphor for Infinite Navigation in Virtual Worlds with a Restricted Walking Workspace," Proceedings of the 16th ACM Symposium on Virtual Reality Software and Technology, Kyoto Japan, Nov. 18-20, 2009, pp. 155-162.

(Continued)

*Primary Examiner* — Ryan M Gray

(57) ABSTRACT

A virtual reality apparatus comprising: i) a plurality of sensors for detecting objects in the vicinity of a user of the virtual reality apparatus; and ii) a controller coupled to the plurality of sensors and configured to determine that an object has been detected. The controller determines a direction of the detected object with respect to the user. The controller generates a glowing region in a virtual reality image being viewed by the user. The location of the glowing region in the virtual reality image notifies the user of the direction of the detected object. The controller generates an audible notification in response to detection of the detected object and determines a distance of the detected object with respect to the user.

14 Claims, 7 Drawing Sheets

(56) References Cited

U.S. PATENT DOCUMENTS

| | | | | |
|---|---|---|---|---|
| 2016/0077547 A1* | 3/2016 | Aimone | ............ | G06F 3/012 345/8 |
| 2016/0093105 A1* | 3/2016 | Rimon | ............ | G06T 19/006 345/633 |
| 2016/0171771 A1* | 6/2016 | Pedrotti | ............ | G02B 27/017 345/633 |

OTHER PUBLICATIONS

Cirio, G., et al., "Walking in a Cube: Novel Metaphors for Safely Navigating Large Virtual Environments in Restricted Real Workspaces," IEEE Transactions on Visualization and Computer Graphics, vol. 18, No. 4, Apr. 2012, pp. 546-554.

Foreign Communication From a Related Counterpart Application, European Application No. 16182536.9-1972, Extended European Search Report dated Jan. 13, 2017, 11 pages.

* cited by examiner

APPARATUS AND METHOD FOR NOTIFYING A VIRTUAL REALITY USER OF REAL WORLD OBJECTS

TECHNICAL FIELD

The present application relates generally to virtual reality (VR) headsets and, in particular, to a system for notifying a VR headset user of real world objects.

BACKGROUND

Virtual reality (VR) equipment is becoming increasingly popular, both for entertainment uses, training uses, and commercial uses. A user experiences virtual reality by wearing a VR headset or similar equipment and operating a virtual reality software application that controls the VR equipment. The VR headset projects three-dimensional (3D) images of a virtual world that may appear quite real to the user. However, while the user is playing virtual reality content, the user is not able to see what is happening in the real world around the user. As a result, the user may walk into, or be hit by, real world objects, such as walls, furniture, or people or pets passing by.

Therefore, there is a need in the art for an improved virtual reality experience. In particular, there is a need for apparatuses and methods that alert a VR headset user about real world objects that are near the user.

SUMMARY

To address the above-discussed deficiencies of the prior art, it is a primary object to provide a virtual reality apparatus comprising: i) a plurality of sensors for detecting objects in the vicinity of a user of the virtual reality apparatus; and ii) a controller coupled to the plurality of sensors and configured to determine that an object has been detected and to determine a direction of the detected object with respect to the user. The controller is further configured to generate a glowing region in a virtual reality image being viewed by the user, the location of the glowing region in the virtual reality image notifying the user of the direction of the detected object.

In one embodiment, the controller is further configured to generate an audible notification in response to detection of the detected object.

In another embodiment, the controller is further configured to determine a distance of the detected object with respect to the user.

In still another embodiment, the controller is further configured to modify a parameter of the glowing region, the modified parameter notifying the user of the distance of the detected object.

In yet another embodiment, the modified parameter is the thickness of the glowing region.

In a further embodiment, the modified parameter is the brightness of the glowing region.

In a still further embodiment, the controller is further configured to modify a frequency of the audible notification to indicate the detected object is moving towards the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged virtual reality (VR) equipment.

The present disclosure describes apparatuses and methods that use visual and audible alerts to notify the user about real world objects that have been detected in the real world around the user, while the user is still operating in the virtual world in which real world objects are not seen. These visual and audible notifications give users the ability to sense real world objects around them without taking off the virtual reality gears or turning on a camera view for the moment.

The disclosed apparatus gives notification of real world object detection to the user by means of a visual effect on the virtual reality screen (i.e., a glowing edge on the VR screen). Depending on which edges glow, the visual notification can indicate the object is in one of six different directions with respect to the user. The disclosed apparatus may also indicate the distance of the detected object according to the relative thickness of the glowing edge(s) and/or the relative brightness of the glowing edge(s). The disclosed apparatus may also give audible notifications that indicate the distance of a detected object, wherein a higher frequency indicates a closer object and/or an approaching object. A "threshold distance" may be used to control the visual and audible effects. If an object is closer than the threshold distance (e.g., 6 feet), the visual and audible notifications are activated. Outside the threshold distance, the visual and audible notifications are not active.

Figure 1:
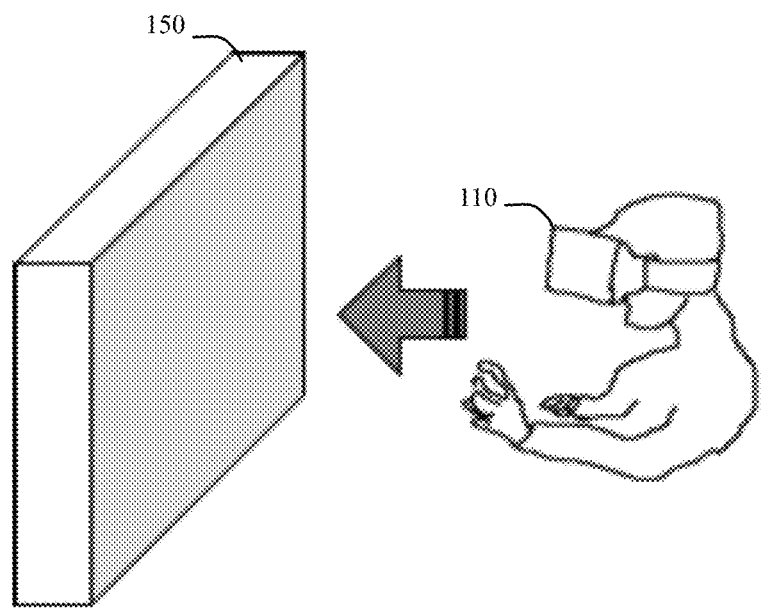
FIG. 1 illustrates a user wearing a virtual reality (VR) headset according to one embodiment of the disclosure.

FIG. 1 illustrates a user wearing virtual reality (VR) headset 110 according to one embodiment of the disclosure. While the user is wearing VR headset 110, the user cannot see wall 150 that is in front of the user, unless VR headset 110 is operating in camera mode. But if the user is instead viewing virtual reality content (e.g., a video game), the user can only see the VR video projected on the display inside the headset and may, therefore, walk into wall 150. Even if the user is sitting or standing in one spot, the user still cannot see another person or a pet that walk into the user.

Accordingly, the disclosed VR headset 110 is configured to detect objects in the near vicinity of the user and to provide the user with visual and audible notifications or alerts related to the detected objects. VR headset 110 detects objects in the near vicinity of the user using an array of sensors that are integrated into VR headset 110. The sensors may comprise radio frequency (radar) sensors, infrared sensors, or acoustic (sonar) sensors, or a combination of two or more of those types of sensors.

Figure 2A:
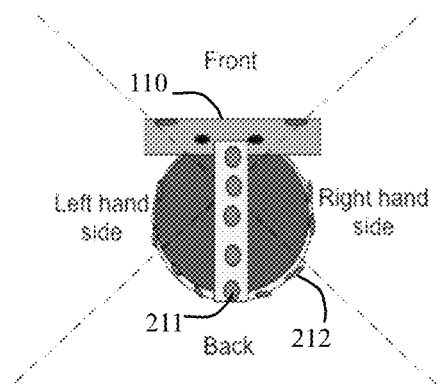
FIGS. 2A, 2B, and 2C are various views of a user wearing a virtual reality (VR) headset.
Figure 2B:
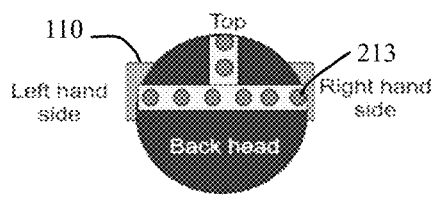
Figure 2C:
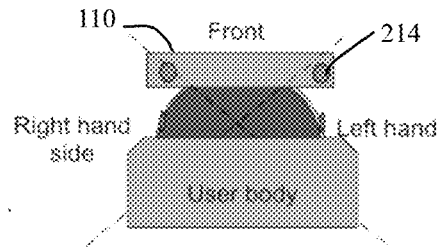

FIGS. 2A, 2B, and 2C are various views of a user wearing virtual reality (VR) headset 110. FIG. 2A is a top view of VR headset 110 and the head of the user. A plurality of sensors, including exemplary sensors 211 and 212, are disposed on the top of VR headset 110, on the top strap that runs over the top of the user's head from the top of VR headset 110 to the back of the user's head, and on the side strap that runs around the back of the user's head from the left side of VR headset 110 to the right side of VR headset 110. FIG. 2B is a rear view of VR headset 110 and the head of the user. A plurality of sensors, including exemplary sensor 213, are disposed on the top strap that runs over the top of the user's head from the top of VR headset 110 to the back of the user's head, and on the side strap that runs around the back of the user's head from the left side of VR headset 110 to the right side of VR headset 110. FIG. 2C is a bottom view of VR headset 110 and the head of the user. A plurality of sensors, including exemplary sensor 214, are disposed on the bottom of VR headset 110.

FIGS. 3A, 3B, 3C, 3D, 3E, and 3F are exemplary virtual reality (VR) visual notifications according to embodiments of the disclosure. In FIGS. 3A-3F, glowing regions (or extra bright regions or different color regions) are used to indicate the locations or directions of objects in the vicinity of the user.

Figure 3A:
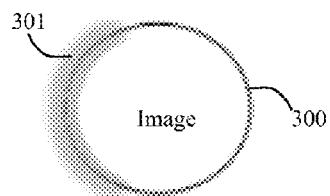
FIGS. 3A, 3B, 3C, 3D, 3E, and 3F are exemplary virtual reality (VR) visual notifications according to embodiments of the disclosure.

FIG. 3A illustrates circular VR screen 300 of VR headset 110, which displays the VR image viewed by the user. Glowing region 301 on the left edge of screen 300 indicates that an object has been detected to the left of the user by the sensors on VR headset 110.

Figure 3B:
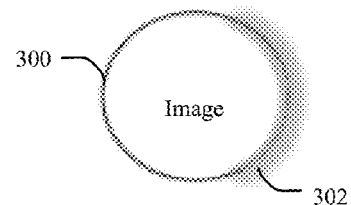

FIG. 3B illustrates circular VR screen 300 of VR headset 110, which displays the VR image viewed by the user. Glowing region 302 on the right edge of screen 300 indicates that an object has been detected to the right of the user by the sensors on VR headset 110.

Figure 3C:
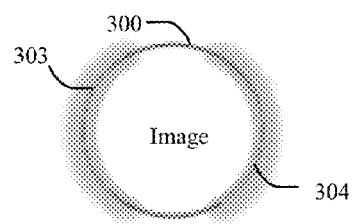

FIG. 3C illustrates circular VR screen 300 of VR headset 110, which displays the VR image viewed by the user. Glowing region 303 on the left edge of screen 300 and glowing region 304 on the right edge of screen 300 indicate that an object has been detected to the front of the user by the sensors on VR headset 110. Optionally, glowing regions 303 and 304 may be made extra bright or a different color in comparison to the regions in FIGS. 3A, 3B, 3E, and 3F to indicate the locations or directions of objects in front of the user.

Figure 3D:
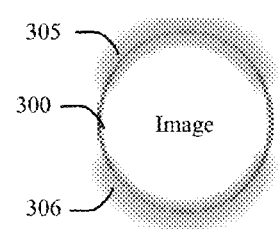

FIG. 3D illustrates circular VR screen 300 of VR headset 110, which displays the VR image viewed by the user. Glowing region 305 on the top edge of screen 300 and glowing region 306 on the bottom edge of screen 300 indicate that an object has been detected to the rear of the user by the sensors on VR headset 110. Optionally, glowing regions 305 and 306 may be made extra bright or a different color in comparison to the regions in FIGS. 3A, 3B, 3E, and 3F to indicate the locations or directions of objects to the rear of the user.

Figure 3E:
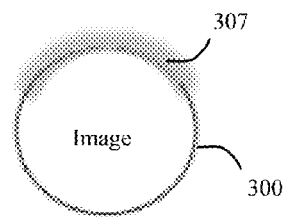

FIG. 3E illustrates circular VR screen 300 of VR headset 110, which displays the VR image viewed by the user. Glowing region 307 on the top edge of screen 300 indicates that an object has been detected above the user by the sensors on VR headset 110.

Figure 3F:
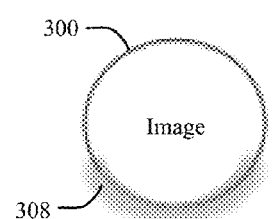

FIG. 3F illustrates circular VR screen 300 of VR headset 110, which displays the VR image viewed by the user. Glowing region 308 on the bottom edge of screen 300 indicates that an object has been detected below the user by the sensors on VR headset 110.

Figure 4A:
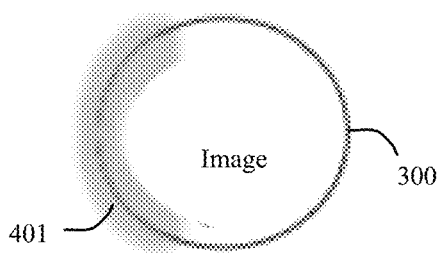
FIGS. 4A and 4B are exemplary virtual reality (VR) visual notifications according to embodiments of the disclosure.
Figure 4B:
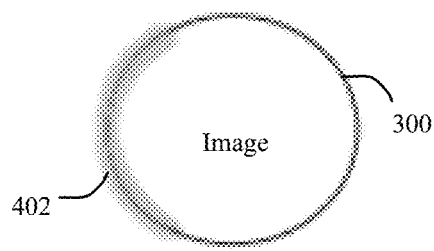

FIGS. 4A and 4B are exemplary virtual reality (VR) visual notifications according to embodiments of the disclosure. FIG. 4A illustrates circular VR screen 300 of VR headset 110, which displays the VR image viewed by the user. Glowing region 401 on the left edge of screen 300 is relatively thick, which indicates that an object detected to the left of the user is relatively close to the user. FIG. 4B illustrates circular VR screen 300 of VR headset 110, which displays the VR image viewed by the user. Glowing region 402 on the left edge of screen 300 is relatively thin, which indicates that an object detected to the left of the user is relatively far away from the user.

In FIGS. 4A and 4B, the thickness of glowing region 401 is modified to indicate the relative distance of a detected object. The user is notified that an object is coming closer if a glowing region becomes thicker. Alternatively, the brightness of the glowing region may be modified to indicate the relative distance of a detected object. The user is notified that an object is coming closer if the glowing region becomes brighter. In still another alternative embodiment, the thickness and the brightness of the glowing region may both be modified to indicate the relative distance of the detected object. The user is notified that an object is coming closer if the glowing region becomes thicker and brighter. In still other embodiments, the glowing region may flicker or flash if the detected object is moving closer to the user.

Figure 5:
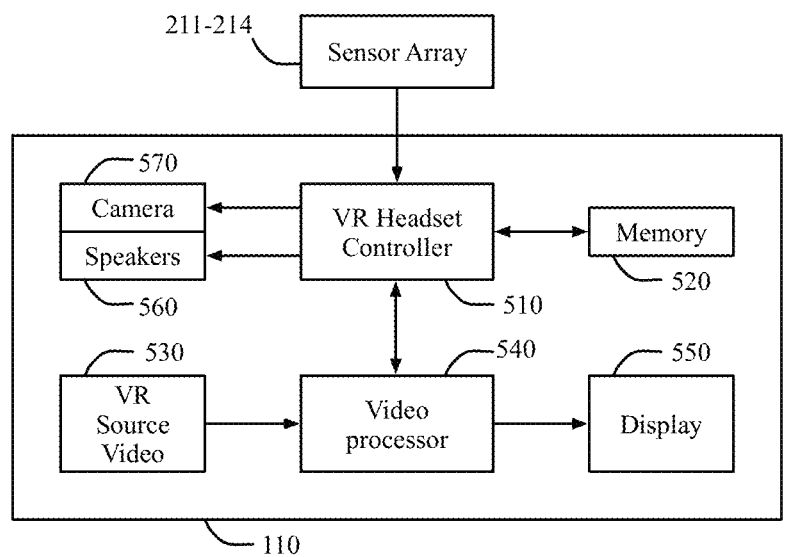
FIG. 5 is a block diagram of an exemplary virtual reality (VR) headset according to one embodiment of the disclosure.

FIG. 5 is a block diagram of virtual reality (VR) headset 110 according to one embodiment of the disclosure. VR headset 110 comprises an array of sensors, including sensors 211-214, disposed on the exterior surfaces and the head straps of VR headset 100. VR headset further comprises VR headset controller 510, memory 520, VR source video 530, video processor 540, display 550, speakers 560, and camera 570.

VR headset controller 510 is a microprocessor or microcontroller that controls the overall operation of VR headset 510 by executing an operating system program and one or more application programs stored in memory 520. Video processor 540 receives source video from VR source video 530, which video processor 540 then displays on one or more screens of display 550. VR source video 530 may be an external VR video player coupled wirelessly or by wireline to VR headset 110. Alternatively, VR source video 530 may be an internal memory (including a part of memory 520), in which VR video content is stored. In camera mode, VR headset controller 510 directs the real-world output of camera 570 to video processor 540 so that the user can see the real-world around the user on display 550, instead of the VR video content.

According to the principles of the disclosure, VR headset controller 510 also receives the output of sensor array 211-214. Depending on which sensors have detected an object closer than a threshold distance, VR headset controller 510 is configured to determine direction, distance, and change in distance (i.e., movement and/or speed) of the detected object. Accordingly, in response to the detected object, VR headset controller 510 is configured to direct video processor 540 to create one or more glowing edges on screen 300, as shown above in FIGS. 3A-3F and FIGS. 4A and 4B. Optionally, VR headset controller 510 may also cause speakers 560 to emit an audible notification (e.g., beep, tone, chirp) when an object is detected. VR headset controller 510 may also cause speakers 560 to increase or decrease the frequency of the audible notification at the distance of the detected object changes. For example, an increase in frequency of a tone indicates that a detected object is moving closer and a decrease in frequency of a tone indicates that the detected object is moving away.

Figure 6:
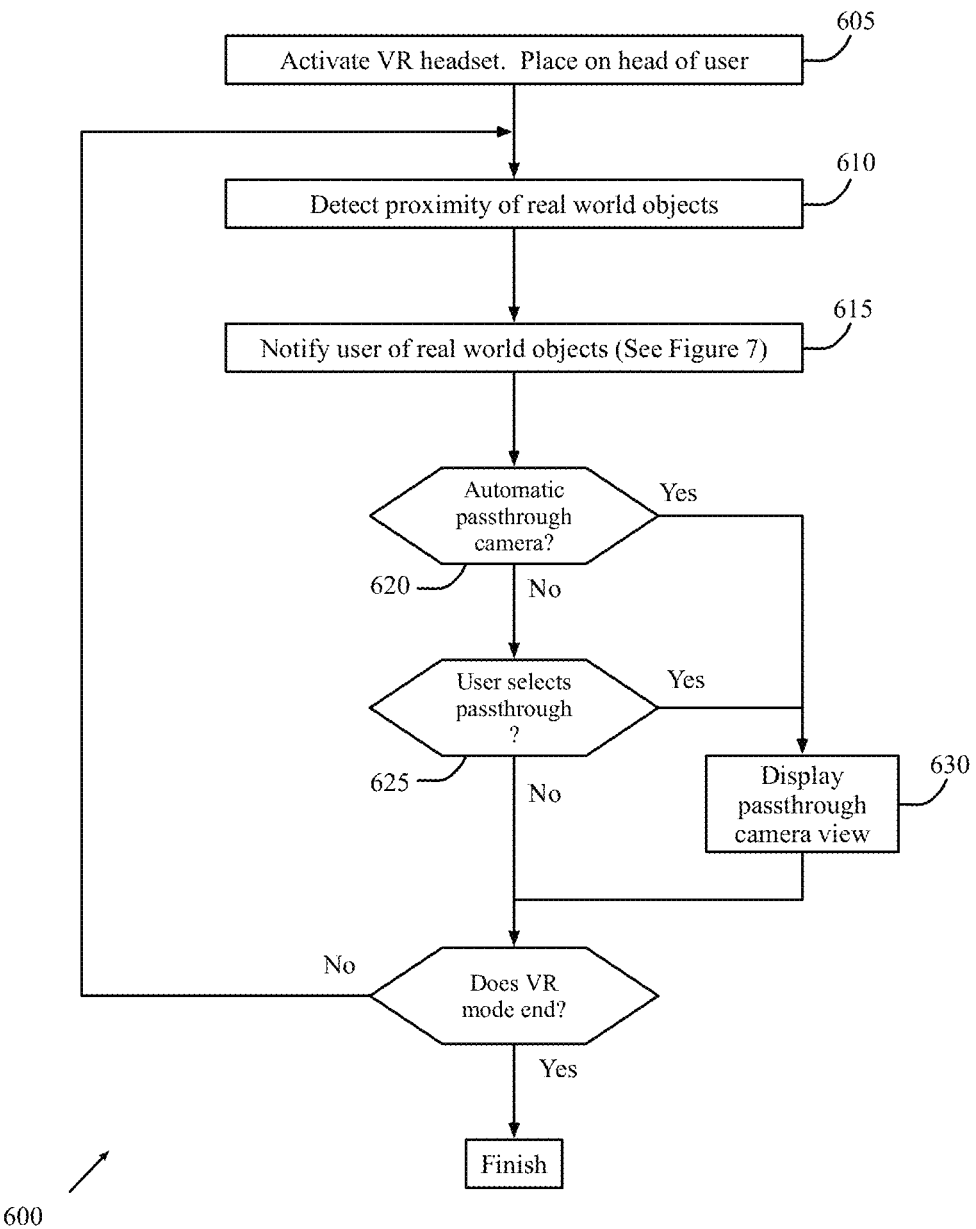
FIG. 6 is a flow diagram illustrating the operations of an exemplary virtual reality (VR) headset according to one embodiment of the disclosure.

FIG. 6 depicts flow diagram 600, which illustrates the operations of virtual reality (VR) headset 110 according to one embodiment of the disclosure.

Initially, the user activates VR headset 110 and places VR headset 110 on the user's head (step 605). During the course of operation, sensor array 211-214 continually detects the proximity of real world objects to see if any are closer than a threshold distance (step 610). If objects are detected within a threshold distance, VR headset 110 notifies the user of the detected real world objects (See FIG. 7 for further details) (step 615).

In an object is detected, VR headset 110 determines if automatic passthrough camera view is enabled (step 620). If automatic passthrough camera view is enabled ("Yes" in Step 620), VR headset 110 shuts off the VR video and displays the passthrough camera view from camera 570 so the user can see the real world (step 630). If automatic passthrough camera view is not enabled ("No" in Step 620), VR headset 110 determines if the user has selected passthrough camera view manually (step 625). If the user selects camera view ("Yes" in Step 625), VR headset 110 shuts off the VR video and displays the passthrough camera view from camera 570 so the user can see the real world (step 630). At the end of either step 625 or 630, VR headset 110 determines whether or not virtual reality mode has ended. If VR mode has not ended, then VR headset 110 returns to step 610.

Figure 7:
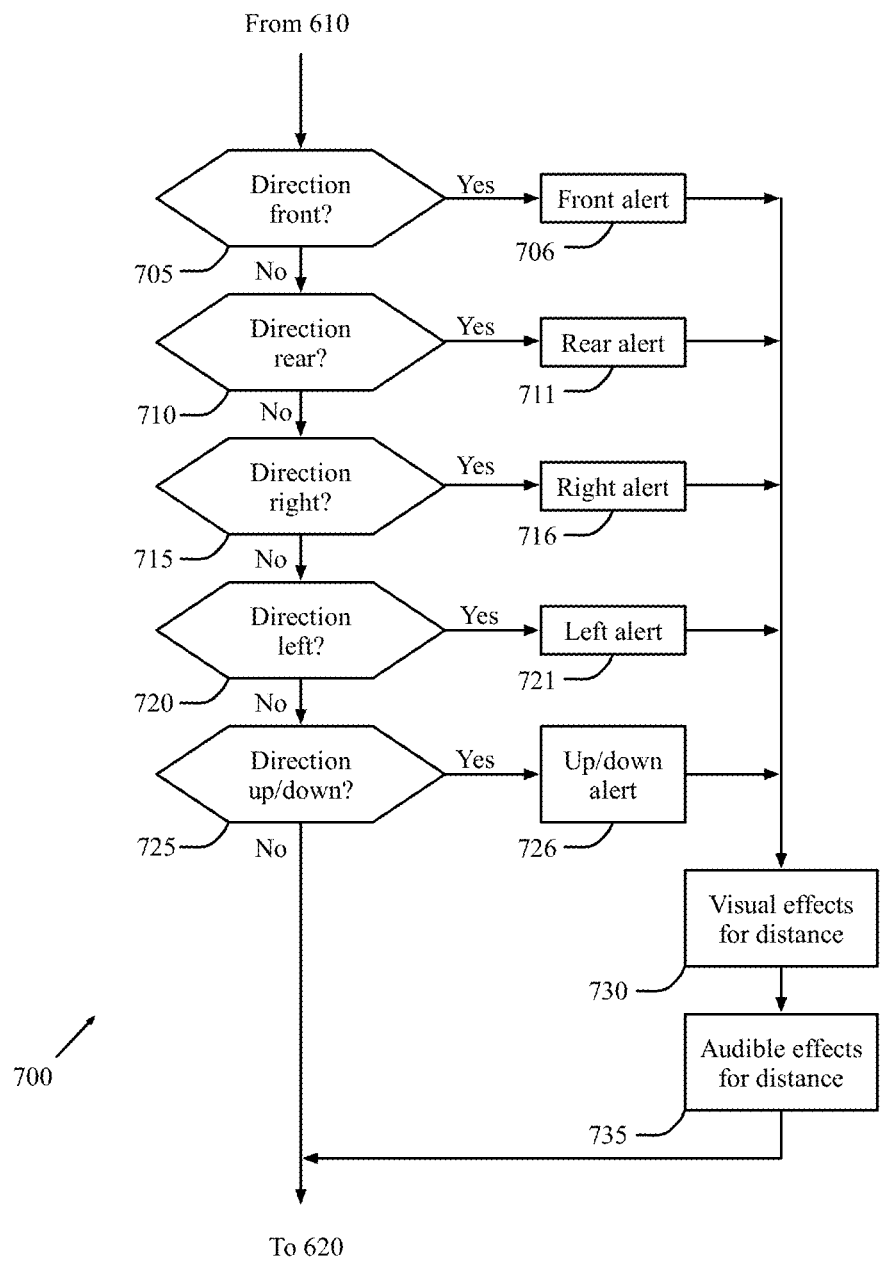
FIG. 7 is a flow diagram illustrating the operations of an exemplary virtual reality (VR) headset according to one embodiment of the disclosure.

FIG. 7 depicts flow diagram 700, which illustrates the operations of virtual reality (VR) headset 110 according to one embodiment of the disclosure. From step 610 in FIG. 6, it assumed an object has been detected. Next, VR headset 110 determines if the detected object is in front of the user (step 705). If yes, VR headset 110 displays a glowing edge as in FIG. 3C (step 706) and then performs a visual effect for distance as in FIGS. 4A and 4B (step 730) and audible effects for distance (step 735).

If no, VR headset 110 determines if the detected object is to the rear of the user (step 710). If yes, VR headset 110 displays a glowing edge as in FIG. 3D (step 711) and then performs a visual effect for distance as in FIGS. 4A and 4B (step 730) and audible effects for distance (step 735).

If no, VR headset 110 determines if the detected object is to the right of the user (step 715). If yes, VR headset 110 displays a glowing edge as in FIG. 3B (step 716) and then performs a visual effect for distance as in FIGS. 4A and 4B (step 730) and audible effects for distance (step 735).

If no, VR headset 110 determines if the detected object is to the left of the user (step 720). If yes, VR headset 110 displays a glowing edge as in FIG. 3A (step 721) and then performs a visual effect for distance as in FIGS. 4A and 4B (step 730) and audible effects for distance (step 735).

If no, VR headset 110 determines if the detected object is above or below the user (step 725). If yes, VR headset 110 displays a glowing edge as in FIG. 3E or 3F (step 726) and then performs a visual effect for distance as in FIGS. 4A and 4B (step 730) and audible effects for distance (step 735). After the completion of steps 730 and 735, VR headset 110 returns to step 620 in FIG. 6.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A virtual reality apparatus comprising:
a plurality of sensors configured to detect objects in a vicinity of a user of the virtual reality apparatus;
a display configured to display a virtual reality image, wherein the display comprises a plurality of peripheral regions; and
a controller coupled to the plurality of sensors and configured to determine that an object has been detected and to determine a direction of and a relative distance to the detected object with respect to the virtual reality apparatus,
wherein the controller is further configured to generate a glowing region in at least one of the peripheral regions of the plurality of peripheral regions, wherein a location of the glowing region is configured to indicate the direction of the detected object with respect to the virtual reality apparatus, wherein the controller is further configured to modify a thickness parameter of the glowing region in the peripheral region of the plurality of peripheral regions such that the modified thickness parameter of the glowing region increases as the relative distance to the detected object decreases with respect to the virtual reality apparatus, the thickness parameter notifies a user of the relative distance of the detected object, and wherein the plurality of peripheral regions comprise at least a lateral peripheral region and a vertical peripheral region and wherein the vicinity comprises an area that includes:
in front of the user, and
at least one of: to a side of the user, to a rear of the user, above the user, or below a field of view of a user.

2. The virtual reality apparatus as set forth in claim 1, wherein the controller is further configured to generate an audible notification in response to detection of the detected object.

3. The virtual reality apparatus as set forth in claim 1, wherein the controller is further configured to modify a brightness parameter of the glowing region such that the modified brightness parameter of the glowing region increases as the relative distance to the detected object decreases with respect to the virtual reality apparatus.

4. The virtual reality apparatus as set forth in claim 1, wherein the controller is further configured to generate an audible notification in response to detection of the detected object.

5. The virtual reality apparatus as set forth in claim 4, wherein the controller is further configured to modify a frequency of the audible notification to indicate the relative distance to the detected object is decreasing with respect to the virtual reality apparatus.

6. A method comprising:
   displaying, by a display in a virtual reality apparatus, a virtual reality image, wherein the display comprises a plurality of peripheral regions;
   detecting, by a plurality of sensors in the virtual reality apparatus, an object in a vicinity of the virtual reality apparatus;
   determining, by a controller in the virtual reality apparatus, a direction and a relative distance to the detected object with respect to the virtual reality apparatus; and
   in response to determining that an object has been detected proximate to the virtual reality apparatus, generating a glowing region in at least one of the plurality of peripheral regions, wherein a location of the glowing region is configured to indicate the direction of the detected object with respect to the virtual reality apparatus, wherein a thickness parameter of the glowing region in at least one of the peripheral regions increases as the relative distance to the detected object decreases with respect to the virtual reality apparatus, the thickness parameter notifies a user of the relative distance to the detected object, and wherein the plurality of peripheral regions comprise at least a lateral peripheral region and a vertical peripheral region and wherein the vicinity comprises an area that includes:
   in front of the user, and
   at least one of: to a side of the user, to a rear of the user, above the user, or below a field of view of a user.

7. The method as set forth in claim 6, further comprising generating an audible notification in response to detection of the detected object.

8. The method as set forth in claim 6, wherein a brightness parameter of the glowing region in at least one of the peripheral regions increases as the relative distance to the detected object decreases with respect to the virtual reality apparatus.

9. The method as set forth in claim 6, further comprising generating an audible notification in response to detection of the detected object.

10. The method as set forth in claim 9, further comprising modifying a frequency of the audible notification to indicate the detected object is moving towards the virtual reality apparatus.

11. A non-transitory computer readable medium comprising a plurality of instructions, when executed, the plurality of instructions configured to cause one or more processors of a virtual reality apparatus to:
    detect, via a plurality of sensors, objects in a vicinity of a user of the virtual reality apparatus;
    display, via a screen, a virtual reality image, wherein the screen comprises a plurality of peripheral regions; and
    a controller coupled to the plurality of sensors and configured to determine that an object has been detected and to determine a direction of the detected object and a relative distance to the detected object with respect to the virtual reality apparatus, wherein the controller is further configured to generate a glowing region in at least one of the peripheral regions, wherein a location of the glowing region in one or more of the plurality of peripheral regions is configured to indicate the direction of the detected object with respect to the virtual reality apparatus, wherein the controller is further configured to modify a thickness parameter of the glowing region in at least one of the peripheral regions such that the thickness parameter increases as the relative distance to the detected object decreases with respect to the virtual reality apparatus, the thickness parameter notifies a user of the relative distance to the detected object, and wherein the plurality of peripheral regions comprise at least a lateral peripheral region and a vertical peripheral region and wherein the vicinity comprises an area that includes:
    in front of the user, and
    at least one of: to a side of the user, to a rear of the user, above the user, or below a field of view of a user.

12. The non-transitory computer readable medium as set forth in claim 11, wherein the plurality of instructions is further configured to cause the one or more processors to generate an audible notification in response to detection of the detected object.

13. The non-transitory computer readable medium as set forth in claim 12, wherein the controller is further configured to modify a frequency of the audible notification to indicate the detected object is moving towards the virtual reality apparatus.

14. The virtual reality apparatus as set forth in claim 1, wherein one or more of the plurality of sensors are disposed on a headstrap of the virtual reality apparatus.

* * * * *